(12) United States Patent
Kaneko

(10) Patent No.: US 11,376,825 B2
(45) Date of Patent: Jul. 5, 2022

(54) PLASTIC LAMINATE AND PROCESS FOR MANUFACTURING THE SAME

(71) Applicant: SHIN-ETSU CHEMICAL CO., LTD., Tokyo (JP)

(72) Inventor: Tatsuro Kaneko, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 67 days.

(21) Appl. No.: 16/932,916

(22) Filed: Jul. 20, 2020

(65) Prior Publication Data

US 2021/0016551 A1 Jan. 21, 2021

(30) Foreign Application Priority Data

Jul. 19, 2019 (JP) .............................. JP2019-134009

(51) Int. Cl.
*B32B 27/08* (2006.01)
*B32B 27/20* (2006.01)
*B32B 27/28* (2006.01)

(52) U.S. Cl.
CPC .............. *B32B 27/08* (2013.01); *B32B 27/20* (2013.01); *B32B 27/28* (2013.01); *B32B 2250/03* (2013.01); *B32B 2250/24* (2013.01); *B32B 2255/10* (2013.01); *B32B 2255/26* (2013.01); *B32B 2264/1021* (2020.08); *B32B 2264/301* (2020.08); *B32B 2307/412* (2013.01); *B32B 2307/536* (2013.01); *B32B 2307/554* (2013.01); *B32B 2307/732* (2013.01); *B32B 2310/0831* (2013.01); *B32B 2386/00* (2013.01); *B32B 2605/006* (2013.01); *B32B 2605/08* (2013.01)

(58) Field of Classification Search
None
See application file for complete search history.

(56) References Cited

U.S. PATENT DOCUMENTS

| 2017/0123108 A1* | 5/2017 | Kobori ................... G02B 1/113 |
| 2018/0056635 A1* | 3/2018 | van Heerbeek .......... C09D 7/41 |
| 2019/0015868 A1 | 1/2019 | Masuda et al. |

FOREIGN PATENT DOCUMENTS

| JP | 2013-170209 A | 9/2013 |
| JP | 2015-066886 A | 4/2015 |
| WO | 2017/115819 A1 | 7/2017 |

* cited by examiner

*Primary Examiner* — Sheeba Ahmed
(74) *Attorney, Agent, or Firm* — Oliff PLC

(57) ABSTRACT

Provided is a material with improved surface hardness and abrasion resistance of a plastic substrate and a process for manufacturing the same.
A plastic laminate including a plastic substrate and a hard coat layer formed on the plastic substrate, wherein the hard coat layer consists of a cured film of a hard coat agent including at least a polysilazane compound and nano-silica having an average particle size of 20 to 100 nm, wherein a continuous hardness difference is provided between the plastic substrate side of the hard coat layer and the surface layer side opposite thereto.

9 Claims, 1 Drawing Sheet

[FIG. 1]
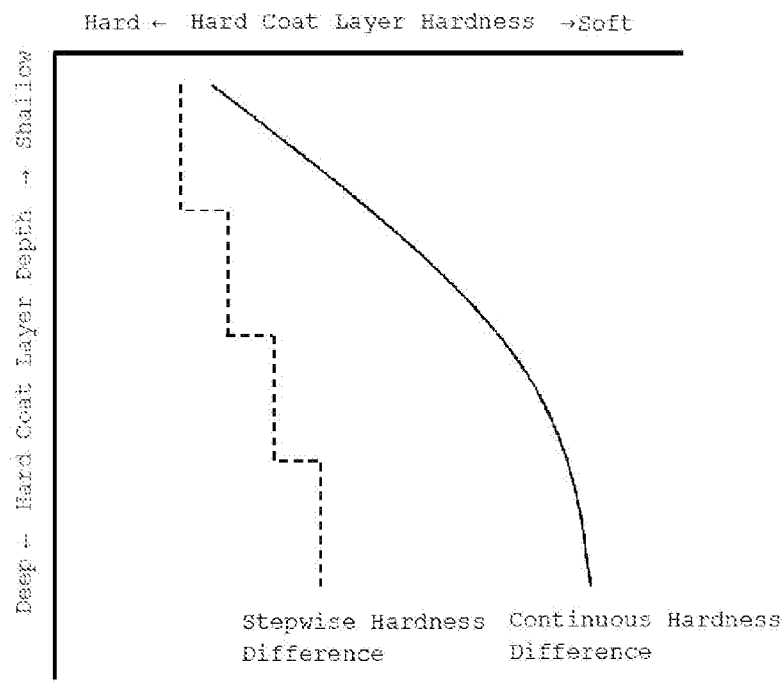
[FIG. 2]
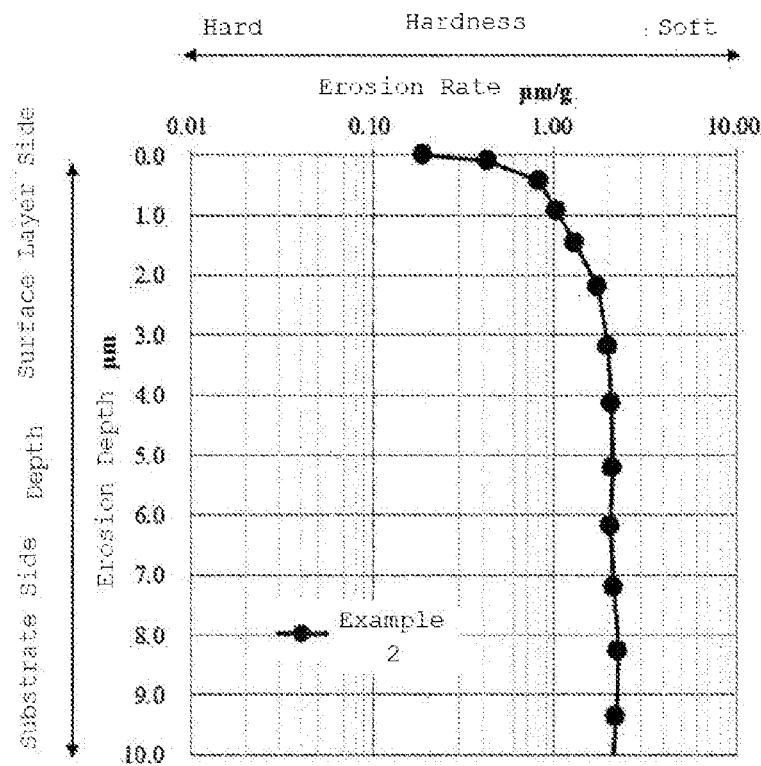

PLASTIC LAMINATE AND PROCESS FOR MANUFACTURING THE SAME

TECHNICAL FIELD

The present invention relates to a plastic laminate with high hardness and excellent abrasion resistance, and a process for manufacturing the same.

BACKGROUND ART

Plastics represented by polycarbonate and the like are superior to glass in toughness, lightweight property and processing moldability, therefore attempts to replace members where glass has been used with plastics have become prominent in each field. Particularly in the automotive field, windows occupy a large area of the exterior such as front windows, rear windows, side windows, and roof windows, and there are various merits by replacing these members from glass to plastics such as polycarbonate.

First, the first merit is significant weight reduction in vehicle weight. In the automotive industry, since weight reduction is directly linked to improvement of fuel efficiency, weight reduction of each member has been actively promoted, however it is considered that it is difficult to significantly reduce weight over the current level from the viewpoint of safety. However, if plastic materials may be modified to a level that satisfies safety standards, drastic weight reduction is possible. In addition to reduce the load of the window itself, it is possible to eliminate a metal frame that was indispensable to support a glass window with low toughness, therefore cost reduction may be expected by totally reducing the number of members.

In addition, the second merit is improvement in designability and processability. Conventional glass has a great restriction on its shape, and all car models have similar designs, but by using plastics that are easy to process, a car with an unconventional design may be produced.

However, in order to obtain these merits, the plastics used need to satisfy vehicle safety standards.

In Japan, safety standards were revised in July 2017 so that plastics may be used not only in rear windows, but also in front windows. Therefore, attempts are being actively made to enhance the safety of the plastic window. As a method for improving the safety, a method using hard coat treatment is the mainstream, and it is aimed to improve pencil hardness and abrasion resistance of the plastic surface. Since it is fully assumed that flying stones or the like will hit during driving, hard pencil hardness is also required as surface hardness. In addition, the abrasion resistance is required for a front window and a rear window that are supposed to be rubbed by a wiper with sand etc. caught in it.

Most of the hard coats have a two-layer or three-layer coat, and it has been reported that a hard coat layer includes epoxy based silanes, acrylic based silanes or alkoxysilanes, in which silica fine particles are mixed in the top coat, is used (see, for example, Patent Document 1). However, in this method, although it may be used in roof windows without wipers, the abrasion resistance is insufficient in front windows and rear windows.

In addition, although a method using scaly metal oxide fine particles (see, for example, Patent Document 2) has been reported, in this method, the abrasion resistance is good, but the pencil hardness is insufficient.

A method for forming dense silica by CVD in the top coat has also been reported in order to improve the pencil hardness and the abrasion resistance (see, for example, Patent Document 3). However, formation of the silica film by CVD is less productive because it is batch production or requires a high temperature of several hundred degree Celsius, and it is unacceptable step for an automobile manufacturing plant where several thousands to several ten thousands vehicles per model are produced each month.

Accordingly, in order to solve the above problems, it is required to develop an approach that may impart high hardness and high abrasion resistance to the surface of the plastic substrate, and that is simple and has high productivity.

CITATION LIST

Patent Literatures

Patent Document 1: Japanese Patent Laid-Open No. 2015-66886
Patent Document 2: Japanese Patent Laid-Open No. 2013-170209
Patent Document 3: International Publication No. WO2017/115819

SUMMARY OF INVENTION

Technical Problem

The present invention has been made in view of the above circumstances, and an object thereof is to provide a plastic laminate with improved surface hardness and abrasion resistance of a plastic substrate and a process for manufacturing the same.

Solution to Problem

In order to solve the above object, the present invention provides a plastic laminate including a plastic substrate and a hard coat layer formed on the plastic substrate, wherein the hard coat layer consists of a cured film of a hard coat agent including at least a polysilazane compound and nano-silica having an average particle size of 20 to 100 nm.

wherein a continuous hardness difference is provided between the plastic substrate side of the hard coat layer and the surface layer side opposite thereto.

In the case of the plastic laminate of the present invention, the fact that there is the continuous hardness difference between the plastic substrate side of the hard coat layer and the surface layer side opposite thereto makes the hardness difference between an arbitrary depth "X" point and a point "X"+"a" where the depth has changed from the "X" point by a minute amount "a" extremely small, and may make it difficult to cause delamination and cracks due to the difference in linear expansion and the like, as compared with a case where the hardness changes stepwise. Therefore, progress of abrasion due to the delamination and the cracks may be suppressed, and high hardness and high abrasion resistance may be imparted to the plastic substrate.

At that time, in the hard coat layer, the surface layer side preferably has higher hardness than the plastic substrate side.

In the case of such a plastic laminate, occurrence of the cracks may be further suppressed by providing the hardness difference such that the plastic substrate side is soft and the surface layer side is hard. Therefore, progress of abrasion starting from the cracks may be further suppressed, and the abrasion resistance may be further improved.

In addition, the thickness of the hard coat layer is preferably 30 to 100 μm.

In such a range, both the hardness and the crack resistance may be achieved.

In addition, the present invention provides a front window for a transporting vehicle including a molded body of the plastic laminate described above.

In the case of the molded body of the plastic laminate of the present invention, it may be suitably used also for a front window for a transporting vehicle, which is required to have the surface hardness and the abrasion resistance.

In addition, the present invention provides a headlight lens for a transporting vehicle including a molded body of the plastic laminate described above.

In the case of the molded body of the plastic laminate of the present invention, it may be suitably used also for a headlight lens for a transporting vehicle, which is required to have the surface hardness and the abrasion resistance.

In addition, the present invention provides a process for manufacturing a plastic laminate, including the steps of:

applying a hard coat agent including at least a polysilazane compound and nano-silica having an average particle size of 20 to 100 nm on a plastic substrate, forming a hard coat layer by curing the applied hard coat agent, in the step of forming the hard coat layer, at least by irradiating a plastic substrate applied with the hard coat agent with energy rays, a continuous hardness difference is generated between the plastic substrate side of the hard coat layer and the surface layer side opposite thereto.

In the case of the process for manufacturing the plastic laminate of the present invention, generating the continuous hardness difference between the plastic substrate side of the hard coat layer and the surface layer side opposite thereto may make the hardness difference between an arbitrary depth "X" point and a point "X"+"a" where the depth has changed from the "X" point by a minute amount "a" extremely small, and may make it difficult to cause delamination and cracks due to the difference in linear expansion and the like, as compared with a case where the hardness changes stepwise. Therefore, progress of abrasion due to the delamination and the cracks may be suppressed, and high hardness and high abrasion resistance may be imparted to the plastic substrate. In addition, in such a method, there is no need to repeat a laminating step of layers with different hardness, therefore productivity may also be improved.

In addition, it is preferably that the energy rays are excimer light.

Since the excimer light is highly absorbed by the polysilazane compound and hardly reaches the plastic substrate during irradiation, it is possible to generate more reliably a continuous hardness difference.

Advantageous Effects of Invention

In the case of the plastic laminate and the process for manufacturing the same of the present invention, the continuous hardness difference between the plastic substrate side of the hard coat layer and the surface layer side opposite thereto makes the hardness difference between an arbitrary depth "X" point and a point "X"+"a" where the depth has changed from the "X" point by a minute amount "a" extremely small, and may make it difficult to cause delamination and cracks due to the difference in linear expansion and the like, as compared with a case where the hardness changes stepwise. Therefore, progress of abrasion due to the delamination and the cracks may be suppressed, and high hardness and high abrasion resistance may be imparted to the plastic substrate.

In addition, in the case of the process for manufacturing the plastic laminate of the present invention, there is no need to repeat a laminating step of layers with different hardness, therefore productivity may also be improved.

BRIEF DESCRIPTION OF THE DRAWINGS

FIG. 1 is a schematic view showing a hard coat layer provided with a continuous hardness difference according to the present invention (solid line) and a hard coat layer provided with a conventional stepwise hardness difference (dotted line).

FIG. 2 is a graphical representation showing the results of measuring the change in hardness in Example 2.

DESCRIPTION OF EMBODIMENTS

Hereinafter, the present invention is described in detail, but the present invention is not limited to these.

Plastic Laminates

The present invention is a plastic laminate including a plastic substrate and a hard coat layer formed on the plastic substrate, wherein the hard coat layer consists of a cured film of a hard coat agent including at least a polysilazane compound and nano-silica having an average particle size of 20 to 100 nm, wherein a continuous hardness difference is provided between the plastic substrate side of the hard coat layer and the surface layer side opposite thereto.

The plastic laminate of the present invention includes a plastic substrate and a hard coat layer formed on the plastic substrate. Hereinafter, the plastic substrate and the hard coat layer included in the plastic laminate of the present invention is described.

Plastic Substrates

In the plastic substrate according to the present invention, any material may be used depending on applications. Incidentally, the plastics according to the present invention refer to synthetic resins. Specific examples of the plastic substrates include general purpose plastics such as polyethylene (PE), polypropylene (PP), polyvinyl chloride (PVC), polystyrene (PS), polyvinyl acetate (PVAc), polyurethane (PUR), polytetrafluoroethylene (PTFE), acrylonitrile butadiene styrene resins (ABS) and acrylic resins (PMMA); engineering plastics such as polyamide (PA), nylon, polycarbonate (PC), polyethylene terephthalate (PET) and Polybutylene terephthalate (PBT); and super engineering plastics such as amorphous polyarylate (PAR), polysulfone (PSF), polyphenylene sulfide (PPS), polyether ether ketone (PEEK), polyimide (PI), bismaleimide resins (BMI) and polyether imide (PEI). Among them, polycarbonate and acrylic resins that are excellent in toughness, processability, optical transparency, etc. are preferable, and in particular inexpensive polycarbonate is more preferable.

Hard Coat Layers

The hard coat layer according to the present invention consists of a cured film of a hard coat agent including at least a polysilazane compound and nano-silica as essential components. It is essential that the hard coat layer according to the present invention is provided with a continuous hardness difference between the plastic substrate side of the hard coat layer and the surface layer side opposite thereto.

With reference to FIG. 1, the continuous hardness difference according to the present invention herein is described. FIG. 1 is a schematic view showing a hard coat layer provided with a continuous hardness difference according to the present invention (solid line) and a hard coat layer provided with a conventional stepwise hardness difference (dotted line). "Continuous hardness difference" according to the present invention does not refer to for example a state in which the region where the hardness is constant and the point where the hardness decreases sharply appear alternately as indicated by the dotted line in the FIG. 1, but refers to a state in which the hardness continues to gradually decrease in the depth direction as indicated by the solid line, when the hardness is measured in the depth direction (thickness direction) of the hard coat layer. The reason for providing the continuous hardness difference is to improve abrasion resistance. The fact that there is the continuous hardness difference makes the hardness difference between an arbitrary depth "X" point and a point "X"+"a" where the depth has changed from the "X" point by a minute amount "a" extremely small, and make it difficult to cause delamination and cracks due to the difference in linear expansion and the like, as compared with the conventional case where the hardness changes stepwise. In the case of the plastic laminate in which such a hard coat layer is formed, progress of abrasion due to the delamination and the cracks may be suppressed, and high hardness and high abrasion resistance may be imparted to the plastic substrate.

In addition, the hard coat layer is preferably provided with a hardness difference so that the plastic substrate side is soft and the surface layer side is hard. In such a material, even if the hardness of the surface is increased, since the hard hard-coat layer is formed on a relatively soft plastic substrate, it is possible to suppress the occurrence of cracks due to the difference in a coefficient of linear expansion and the difference in a Young's modulus, and the progress of abrasion starting from the cracks. Therefore, the abrasion resistance may be further improved.

In addition, the thickness of the hard coat layer is preferably 30 to 100 μm, and more preferably 40 to 60 μm as the entire cured film thickness. In such a range, both the hardness and the crack resistance may be achieved, which is preferable. The hard coat layer may be a single layer or a multi-layer structure of 2 or more layers as long as the continuous hardness difference is provided.

Polysilazane Compounds

The polysilazane compounds are not particularly limited as long as it acts as a hard coat agent when cured. Examples include modified polysilazanes such as inorganic polysilazanes such as perhydropolysilazane or organic polysilazanes such as methyl polysilazane, dimethyl polysilazane, phenyl polysilazane and vinyl polysilazane; hydrocarbon compounds, cyclic saturated hydrocarbon compounds, cyclic unsaturated hydrocarbon compounds, saturated heterocyclic compounds, and unsaturated heterocyclic compounds having a reactive group that chemically reacts with polysilazane to form a crosslinked structure, such as a hydroxyl group, a vinyl group, an amino group and a silyl group that chemically reacts with polysilazane to form a crosslinked structure; and crosslinked polysilazane chemically crosslinked with compounds such as silicone compounds. The above polysilazane compounds preferably include one polysilazane compound alone, or a mixture of two or more polysilazane compounds selected from them, or a polysilazane copolymer consisting of two or more polysilazane structures, from the viewpoint of film properties after curing, it is more preferable that at least one hydrogen atom directly bonded to silicon atom (a hydrosilyl group) is contained in one molecule.

In addition, the polysilazane compound preferably has a weight average molecular weight in the range of 100 to 100,000, more preferably in the range of 1,000 to 50,000, even more preferably in the range of 2,000 to 20,000, from the viewpoint of workability during application. If the weight average molecular weight is 100 or more, there is no risk of deterioration of film quality of coating film due to its high volatility and volatilization during drying of organic solvent and a curing treatment, and if it is 100,000 or less, the solubility in organic solvent does not decrease.

Incidentally, the weight average molecular weight mentioned in the present invention refers to a weight average molecular weight with polystyrene as the standard substance measured by gel permeation chromatography (GPC) under the following conditions.

Measurement Conditions
Developing solvent: tetrahydrofuran (THF)
Flow rate: 0.6 mL/min
Detector: UV detector
Column: TSKgel Guardcolumn SuperH-L
  TSKgel SuperMultiporeHZ-M(4.6 mmI.D.×15 cm×4)
(Both manufactured by Tosoh Corporation)
Column temperature: 40° C.
Sample injection volume: 20 μl (0.5 wt % concentration THF solution)

Further, the polysilazane compound is preferably diluted with organic solvent from the viewpoint of workability during application and storage safety. Examples of the diluent solvents include alkene compounds such as 1-octene, 1-nonene, 1-decene, 1-dodecene and β-myrcene; cycloalkane compounds such as cyclohexane, methylcyclohexane and dimethylcyclohexane; cycloalkene compounds such as cyclohexene; terpene compounds such as p-menthane, d-limonene, l-limonene and dipentene; ester compounds such as n-propyl acetate, isopropyl acetate, n-butyl acetate, isobutyl acetate, isoamyl acetate, ethyl acetoacetate and ethyl caproate; alkyl ether compounds such as diethyl ether and dibutyl ether; glycol ether compounds such as bis (2-methoxyethyl) ether, bis (2-ethoxyethyl) ether and bis (2-butoxyethyl) ether. The dilution ratio is preferably in the range of 100 to 100,000 parts by mass of the solvent, and more preferably 400 to 2,000 parts by mass based on 100 parts by mass of the polysilazane compound.

In addition, the water contents of the polysilazane compound and the diluent solvent are preferably 500 ppm or less, and more preferably 300 ppm or less. When the water content is 500 ppm or less, the polysilazane and the water do not react, and therefore, there is no risk of causing exotherm, generation of hydrogen gas and ammonia gas, thickening, gelation, etc., which is preferable.

Nano-Silica

The nano-silica according to the present invention is added to suppress cracks due to curing shrinkage of the polysilazane compound, it is essential that the average particle size is in the range of 20 to 100 nm. If the average particle size is smaller than 20 nm, the crack suppressing effect is poor, and if it is larger than 100 nm, sedimentation is likely to occur when the hard coat agent is allowed to stand for forming a cured film, therefore a uniform hard coat layer is not formed and the crack suppressing effect may not be obtained. In addition, the amount of nano-silica added is preferably 50 to 200 parts by mass based on 100 parts by mass of the polysilazane compound. In this range, both transparency of appearance and crack resistance may be achieved. In addition, the surface of the nano-silica particles may be treated with a surface treating agent or the like. By performing the treatment with the surface treating agent, aggregation of the particles may be suppressed and dispersibility may be improved. In addition, since the surface treating agent covers water and hydroxyl groups on the surface of the nano-silica, an effect of suppressing gelation due to a contingent reaction with the polysilazane compound may also be expected.

Incidentally, the average particle size of the nano-silica according to the present invention was calculated by measuring the specific surface area using $N_2$ gas according to BET adsorption method, measuring particle density according to pycnometer method, and using the following formula.

$$d = 6,000/\rho s$$

d: particle diameter[nm]
$\rho$: particle density[g/cm$^3$]
s: specific surface area[m$^2$/g]

Additives

If necessary, a curing catalyst, a filler other than nano-silica and the like may be added to the polysilazane compound according to the present invention. The curing catalyst is not particularly limited as long as curing reaction is accelerated by leaving at room temperature, heating, UV irradiation, and the like, and examples of inorganic compound catalysts include homogeneous or heterogeneous metal catalysts including a metal element represented by for example "d" block elements belonging to the 4th period of the periodic table such as titanium, manganese, cobalt, nickel and zinc; platinum group elements such as ruthenium, rhodium, palladium, osmium, iridium and platinum, or compounds containing these metal elements.

In addition, examples of organic catalysts include amine catalysts such as aliphatic amines such as methylamine, dimethylamine, trimethylamine, ethylamine, diethylamine, triethylamine, ethylenediamine and tetramethylethylenediamine; aliphatic amino alcohols such as methylaminoethanol and dimethylaminoethanol; aromatic amines such as aniline, phenylethylamine and toluidine; heterocyclic amines such as pyrrolidine, piperidine, piperazine, pyrrole, pyrazole, imidazole, pyridine, pyridazine and pyrimidine pyrazine.

Examples of other additives include reinforcing inorganic fillers such as fumed silica, fumed titanium dioxide and fumed alumina; non-reinforcing inorganic fillers and ultraviolet reflectors such as molten silica, alumina, zirconium oxide, calcium carbonate, calcium silicate, titanium dioxide, ferric oxide and zinc oxide; ultraviolet absorbers such as benzophenone type, benzotriazole type and triazine type; adhesive aids such as organosiloxane oligomers, organooxysilyl-modified isocyanurate compounds and hydrolysis condensates thereof, containing at least two, preferably two or three functional groups selected from a hydrosilyl group, an alkenyl group, an alkoxysilyl group and an epoxy group; silicone oils such as dimethyl silicones and phenyl silicones, which may be added at an arbitrary ratio.

In addition, the plastic laminate of the present invention may be suitably used especially for a front window and a headlight lens for a transporting vehicle.

Next, a process for manufacturing the plastic laminate of the present invention is described.

Process for Manufacturing Plastic Laminates

The plastic laminate of the present invention is manufactured by applying a hard coat agent containing at least a polysilazane compound and nano-silica on a plastic substrate and performing a curing treatment.

Step of Applying Hard Coat Agents

First, the hard coat agent containing at least the polysilazane compound and the nano-silica having an average particle size of 20 to 100 nm is applied on the plastic substrate. Examples of methods for applying the hard coat agent include roll coating methods such as a chamber doctor coater, a single roll kiss coater, a reverse kiss coater, a bar coater, a reverse roll coater, a forward rotation roll coater, a blade coater and an knife coater; a spin coating method; a dispensing method; a dip method; a spray method; a transfer method; and a slit coat method. It may be applied in any suitable method depending on the size and shape of the plastic substrate. In addition, if necessary, a surface modification treatment of the plastic substrate may be performed before applying the hard coat agent. Examples of the surface modification treatments include inactive modification treatments such as argon plasma treatment, xenon excimer treatment and UV treatment; and active modification treatments such as oxygen plasma treatment and ozone treatment.

Step of Forming Hard Coat Layers

Next, the applied hard coat agent is cured to form a hard coat layer consisting of a cured film of the hard coat agent. The thickness of the hard coat layer is preferably 30 to 100 µm, and more preferably 40 to 60 µm as the entire cured film thickness. In this range, both hardness and crack resistance may be achieved, which is preferable. The hard coat layer is preferably a single layer for process reasons, but may have a multi-layer structure of 2 or more layers. It is preferable that after a hard coat coating film is formed by applying the hard coat agent as describe above, the coating film is subjected to heating/drying treatment in order to cure the coating film. The purposes of this treatment are a complete removal of solvent contained in the coating film and a curing reaction for promoting the exchange reaction from the polysilazane to a polysiloxane bond. The heating/drying temperature is usually in the range of room temperature (25° C.) to 300° C., preferably 70° C. to 200° C. Since many plastic substrates have poor heat resistance, it is more preferable that the temperature is in the range of 70° C. to 120° C. Preferable treatment methods for the heating/drying step of the plastic substrate include heat treatment and steam heat treatment, atmospheric pressure plasma treatment and low temperature plasma treatment. Each is selected according to combination with the corresponding plastic substrate, hard coat coating film, etc.

In addition, in the present invention, in the step of forming the hard coat layer, at least by irradiating the plastic substrate applied with the above hard coat agent with energy rays, a continuous hardness difference is generated between the above plastic substrate side of the above hard coat layer and the surface layer side opposite thereto.

There are several methods to provide a "continuous" hardness difference, but usually a step of laminating layers with different hardness is required. However, in such a conventional method, repeating the lamination step many times complicates the step, and the productivity is reduced. In the present invention, by irradiating with energy rays, the hardness is continuously increased from the inside toward the surface to be irradiated, and it is possible to provide a hardness difference depending on the amount of irradiation. By using this method, the step of laminating layers with different hardness is not required, so that the productivity may be improved.

The type of energy rays is not particularly limited, but it is necessary to generate the continuous hardness difference by the action of curing or densifying the hard coat layer.

Examples of the energy rays include near ultraviolet rays such as UV-A having a wavelength of 315 to 380 nm, UV-B having 280 to 315 nm and UV-C having 200 to 280 nm; vacuum ultraviolet rays such as excimer light having 10 to 200 nm; and X-rays having 0.01 to 10 nm. Among them, UV-C and excimer light, which have curing and densifying action on the polysilazane compound, are preferable, and excimer light, which is highly absorbed by the polysilazane compound and hardly reaches the plastic substrate during irradiation, is more preferable. The amount of irradiation is not particularly limited, but a specific value is preferably in the range of 1,000-500,000 mJ/cm$^2$, when irradiating the polysilazane compound with xenon excimer light. When it is 1,000 mJ/cm$^2$ or more, the hardness difference is significantly provided, which is preferable. In addition, when it is 500,000 mJ/cm$^2$ or less, not only the entire coating film does not become too dense, a preferable hardness difference is obtained, but also the plastic substrate is not deteriorated, which is preferable.

Incidentally, in the present invention, the hardness of the above hard coat layer was measured using MSE (Micro Slurry-jet Erosion) tester MSE-A (manufactured by Palmeso Co., Ltd.), and the smaller the erosion rate (μm/g) measured by the above tester, the higher the hardness was evaluated. The measurement was performed by adding spherical silica having an average particle size of 5 μm to water in an amount of 3% by mass and making a slurry, which was projected perpendicularly to a sample from a projection nozzle of the above apparatus and the depth carved with respect to the projected amount was obtained as an erosion rate. The projected amount at this time was set so that the erosion rate of polymethyl methacrylate (PMMA) resin would be 1.7 μm/g. By this method, the change in the hardness of the above hard coat layer in the thickness direction was evaluated.

EXAMPLES

Hereinafter, although the present invention is specifically described by showing examples and comparative examples, this invention is not limited to the following examples.

Preparation of Hard Coat Agent A

With 4 g of methyl polysilazane having a weight average molecular weight of 3,284 were mixed 8 g of dibutyl ether, 4 g of Exxsol D40, and 4 g of nano-silica having a particle size of 30 nm. The solution was designated as Hard Coat Agent A.

Preparation of Hard Coat Agent B

With 4 g of methyl polysilazane having a weight average molecular weight of 3,284 were mixed 8 g of dibutyl ether, 4 g of Exxsol D40, and 4 g of nano-silica having a particle size of 50 nm. The solution was designated as Hard Coat Agent B.

Preparation of Hard Coat Agent C

With 4 g of methyl polysilazane having a weight average molecular weight of 3,284 were mixed 8 g of dibutyl ether, 4 g of Exxsol D40, and 4 g of nano-silica having a particle size of 80 nm. The solution was designated as Hard Coat Agent C.

Preparation of Hard Coat Agent D

With 4 g of methyl polysilazane having a weight average molecular weight of 3,284 were mixed 8 g of dibutyl ether, 4 g of Exxsol D40, and 4 g of nano-silica having a particle size of 200 nm. The solution was designated as Hard Coat Agent D.

Preparation of Hard Coat Agent E

With 4 g of methyl polysilazane having a weight average molecular weight of 3,284 were mixed 8 g of dibutyl ether, 4 g of Exxsol D40, and 4 g of nano-zirconia having a particle size of 10 nm. The solution was designated as Hard Coat Agent E.

Preparation of Hard Coat Agent F

With 4 g of methyl polysilazane having a weight average molecular weight of 3,284 were mixed 8 g of dibutyl ether, 4 g of Exxsol D40, and 4 g of nano-alumina having a particle size of 100 nm. The solution was designated as Hard Coat Agent F.

Method for Preparing Plastic Laminates

Each of the above Hard Coat Agents A to F was applied to a disc-shaped polycarbonate plate having a diameter of 5 cm and a thickness of 2 mm so that the thickness of the cured film was 50 μm, dried at 100° C., and then cured at 120° C. Then, 10,000 mJ/cm$^2$ of xenon excimer light was irradiated from the hard coat layer side to generate an hardness difference in the hard coat layer.

Evaluation Methods of Plastic Laminates

The properties of the plastic laminates prepared by the above method were evaluated. For evaluation, a pencil hardness test and a Taber abrasion test were performed. Incidentally, the pencil hardness test was performed using a pencil hardness tester (manufactured by Pepaless Co., Ltd.) under a load of 750 g according to JIS K 5600-5-4:1999. The Taber abrasion test was performed using a Taber abrasion tester (manufactured by Tester Sangyo Co., Ltd.). HAZE change was measured using a haze meter (manufactured by Nippon Denshoku Industries Co., Ltd.) after 1,000 rotations under a load of 500 g each using CS-10F as an abrasion wheel according to JIS K 7204:1999.

Example 1

A plastic laminate was prepared by the above method using Hard Coat Agent A. Then, when the prepared plastic laminate was evaluated by the above evaluation methods, the appearance was colorless and transparent, the pencil hardness was 9H, and the HAZE change before and after the Taber abrasion test was Δ0.5.

Example 2

A plastic laminate was prepared by the above method using Hard Coat Agent B. Then, when the prepared plastic laminate was evaluated by the above evaluation methods, the appearance was colorless and transparent, the pencil hardness was 9H, and the HAZE change before and after the Taber abrasion test was Δ0.3.

Example 3

A plastic laminate was prepared by the above method using Hard Coat Agent C. Then, when the prepared plastic laminate was evaluated by the above evaluation methods, the appearance was colorless and transparent, the pencil hardness was 9H, and the HAZE change before and after the Taber abrasion test was Δ0.3.

Comparative Example 1

A plastic laminate was prepared by the above method using Hard Coat Agent D. Then, when the prepared plastic laminate was evaluated by the above evaluation methods, the appearance was aggregated nano-silica visible with the naked eye, cracks had partially occurred, and therefore the evaluation was terminated.

Comparative Example 2

A plastic laminate was prepared by the above method using Hard Coat Agent E. Then, when the prepared plastic laminate was evaluated by the above evaluation methods, the pencil hardness was 9H, but the appearance was white, and therefore the evaluation was terminated.

Comparative Example 3

A plastic laminate was prepared by the above method using Hard Coat Agent F. Then, when the prepared plastic laminate was evaluated by the above evaluation methods, the pencil hardness was 9H, but the appearance was white, and therefore the evaluation was terminated.

Comparative Example 4

A plastic laminate was prepared in the same manner as the above method except that Hard Coat Agent B was used and no xenon excimer light irradiation was performed. That is, no hardness difference was provided in the thickness direction of the hard coat layer. Then, when the prepared plastic laminate was evaluated by the above evaluation methods, the appearance was colorless and transparent, the pencil hardness was 6H, and the HAZE change before and after the Taber abrasion test was Δ35.1.

Comparative Example 5

Hard coat agent B was applied to the same polycarbonate plate as in Example 1 so that the thickness of the cured film was 25 μm, dried and then cured to form Cured Film 1. Then, in the same manner as Cured Film 1, Hard coat agent B was applied onto Cured Film 1 so that the thickness of the cured film was 25 μm, dried and then cured to form Cured Film 2 to prepare a plastic laminate. At this time, by setting the drying temperatures to 25, 40° C., respectively, and the curing temperatures to 100, 120° C., respectively, for Cured Films 1, 2, the temperature was changed stepwise to make Cured Film 2 on the surface layer side harder than Cured Film 1 on the plastic substrate side. Incidentally, no xenon excimer light irradiation was performed. Then, when the prepared plastic laminate was evaluated by the above evaluation methods, the appearance was colorless and transparent, the pencil hardness was 6H, and the HAZE change before and after the Taber abrasion test was Δ32.6.

The results of Examples and Comparative Examples are shown in Table 1.

TABLE 1

| | Hard Coat Agent | Polysilazane Compound | Nano-particle Type | Average Particle Size (nm) | Hard Coat Film Thickness (μm) | Excimer Irradiation (mJ/cm²) | Appearance | Pencil Hardness | HAZE Change before and after Taber Abrasion Test (%) |
|---|---|---|---|---|---|---|---|---|---|
| Example 1 | A | Methyl Polysilazane | Silica | 30 | 50 | 10,000 | Colorless and Transparent | 9H | Δ0.5 |
| Example 2 | B | Methyl Polysilazane | Silica | 50 | 50 | 10,000 | Colorless and Transparent | 9H | Δ0.3 |
| Example 3 | C | Methyl Polysilazane | Silica | 80 | 50 | 10,000 | Colorless and Transparent | 9H | Δ0.3 |
| Comparative Example 1 | D | Methyl Polysilazane | Silica | 200 | 50 | 10,000 | Cracks and Aggregation | — | — |
| Comparative Example 2 | E | Methyl Polysilazane | Zirconia | 10 | 50 | 10,000 | White | 9H | — |
| Comparative Example 3 | F | Methyl Polysilazane | Alumina | 100 | 50 | 10,000 | White | 9H | — |
| Comparative Example 4 | B | Methyl Polysilazane | Silica | 50 | 50 | None | Colorless and Transparent | 6H | Δ35.1 |
| Comparative Example 5 | B | Methyl Polysilazane | Silica | 50 | 50 | None | Colorless and Transparent | 6H | Δ32.6 |

From the results shown in Table 1, Examples 1 to 3 showed sufficient appearances, surface hardnesses and abrasion resistances, and characteristics at a level at which development in various applications including automotive windows may be expected. On the other hand, in Comparative Example 1, since the size of the nano-silica was too large, the silica particles aggregated in the solution of the hard coat agent, and precipitation occurred. In addition, when applied, agglomerates were visually confirmed. In Comparative Examples 2 to 3, since the difference in the refractive index between the polysilazane compound and the nano-filler (nano-particle) was large, light scattering occurred and the appearance became white. In addition, in Comparative Example 4, since no hardness difference was provided in the thickness direction of the hard coat layer, both the surface hardness and the abrasion resistance were inferior to those in Examples 1 to 3. In addition, as in Comparative Example 5, the laminate in which the cured films having different hardness were laminated stepwise had delamination and cracks due to the difference in linear expansion and the like, and was inferior in abrasion resistance to Examples 1 to 3. Moreover, since such a method requires repeated steps, it was inferior in productivity.

In addition, for Example 2, the hardness in the thickness direction of the hard coat layer was measured. The hardness was measured using MSE(Micro Slurry-jet Erosion) tester MSE-A (manufactured by Palmeso Co., Ltd.). The measurement results are shown in FIG. 2.

From FIG. 2, it is seen that the hard coat layer of Example 2 irradiated with excimer light has a high hardness near the surface layer. In addition, in Example 2, it is seen that the hardness gradually changes from the surface layer.

From the above results, since the continuous hardness difference is generated between the plastic substrate side of the hard coat layer and the surface layer side opposite thereto, it is possible to make it difficult to cause delamination and cracks due to the difference in linear expansion and the like, and it has been revealed that it is possible to impart high hardness and high abrasion resistance to the plastic substrate.

Incidentally, the present invention is not limited to the above embodiments. The above embodiments are examples, and has substantially the same configuration as the technical idea described in the claims of the present invention, and any ones exhibiting the same action effect are included in the technical scope of the present invention.

The invention claimed is:

1. A plastic laminate comprising:
   a plastic substrate; and
   a hard coat layer formed on the plastic substrate, and having:
      a plastic substrate side facing the plastic substrate; and
      a surface layer side opposite to the plastic substrate side,
   wherein:
   the hard coat layer consists of a cured film of a hard coat agent comprising at least a polysilazane compound and nano-silica having an average particle size of 20 to 100 nm,
   a continuous hardness difference is provided between the plastic substrate side of the hard coat layer and the surface layer side of the hard coat layer, and
   in the hard coat layer, the surface layer side has higher hardness than the plastic substrate side.

2. The plastic laminate according to claim 1, wherein a thickness of the hard coat layer is 30 to 100 μm.

3. A front window for a transporting vehicle comprising a molded body of the plastic laminate according to claim 1.

4. A front window for a transporting vehicle comprising a molded body of the plastic laminate according to claim 2.

5. A headlight lens for a transporting vehicle comprising a molded body of the plastic laminate according to claim 1.

6. A headlight lens for a transporting vehicle comprising a molded body of the plastic laminate according to claim 2.

7. A process for manufacturing a plastic laminate, the method comprising:
   applying a hard coat agent comprising at least a polysilazane compound and nano-silica having an average particle size of 20 to 100 nm on a plastic substrate,
   forming a hard coat layer by curing the applied hard coat agent, the hard coat layer having:
      a plastic substrate side facing the plastic substrate; and
      a surface layer side opposite to the plastic substrate side,
   wherein:
   in the step of forming the hard coat layer, at least by irradiating the plastic substrate applied with the hard coat agent with energy rays, a continuous hardness difference is generated between the plastic substrate side of the hard coat layer and the surface layer side of the hard coat layer, and
   in the hard coat layer, the surface layer side has higher hardness than the plastic substrate side.

8. The process for manufacturing the plastic laminate according to claim 7, wherein the energy rays are excimer light.

9. The plastic laminate according to claim 1, wherein a pencil hardness of the hard coat layer is 9H or more.

* * * * *